United States Patent Office 3,639,516
Patented Feb. 1, 1972

3,639,516
GRAFT COPOLYMERS
Gordon A. Sarfaty, Doncaster, Victoria, and Geoffrey W. Tregear, Heidelberg, Victoria, Australia, assignors to Cancer Institute Board, Melbourne, Victoria, Australia
No Drawing. Filed June 23, 1969, Ser. No. 835,781
Claims priority, application Australia, July 19, 1968, 40,848/68
Int. Cl. C08f *15/00*
U.S. Cl. 260—818 R                    8 Claims

ABSTRACT OF THE DISCLOSURE

A graft copolymer comprising a polymeric nucleus and surface grafted on to it copolymeric side chains comprising a multiplicity of mer units of the formula

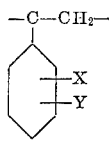

wherein X is at least one group which is reactive with carbonylic steroids and Y is one or more optional substituents which is non-reactive with carbonylic steroids characterised in that substantially the bulk of said polymeric side chains surrounds said nucleus in a thin continuous and homogeneous layer.

---

This invention relates to new and useful copolymers; more particularly it relates to graft copolymers and to processes of their manufacture and use.

A graft copolymer has a nucleus consisting of one polymer or copolymer onto which a number of side chains of another polymer or copolymer is grafted. Graft copolymers generally possess properties which are appreciably different from those of ordinary copolymers formed from the same monomer units but distributed at random in a straight or branched chain.

We have now discovered that certain graft copolymers may be chemically linked to steroids having bond-forming groups and that the resulting particulate or continuous solid polymeric substances comprising macro-molecules of graft copolymers with chemically bonded streoid molecules have remarkable properties useful in biology, bioassay, medical implants and medicine at large.

We have now conceived that polymeric substances having specifically designed surfaces of steroid-reactive groups may be used to produce macromolecular phases, preferably solid substances in the form of particles, films, pellets, tablets or shaped articles, which have a surface layer capable of chemically bonding with certain steroids. In particular we have found that the graft copolymers in which the grafted-on mer unit is capable of accommodating a steroid-reactive substituent are uniquely suitable for the formation of a dense outer surface of reactive groups. In its broadest concept our invention is therefore a graft copolymer comprising a polymeric nucleus and grafted on to it a different copolymerisable co-mer having substituent groups which under streoid preserving conditions are capable of forming a chemical bond with a steroid. Suitable co-mers may be of any vinyl or divinyl compound polymerisable by free radicals as for example disclosed in British Pat. No. 801,528, page 1, lines 68 to 77. Preferred graft copolymers are those in which styrene or substituted styrenes are grafted on to a polymeric nucleus to form polystyrene side chains because steroid reactive groups can be attached readily to these and because the resultant derivatives are highly reactive to steroids.

Accordingly we provide a graft copolymer comprising a polymeric nucleus and surface grafted on to it copolymeric side chains comprising a multiplicity of mer-units of the formula

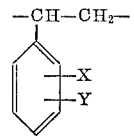

wherein X is at least one group which is reactive with carbonylic steroids and Y stands for one or more optional substituents which is non-reactive with carbonylic steroids characterised in that more than two-thirds by weight of the finished copolymer consists of a polymeric nucleus substantially free from said copolymeric side claims and in that substantially the bulk of said polymeric side chains surrounds said nucleus in a thin continuous and homogeneous layer.

The base (or trunk) polymer forming the nucleus is not narrowly critical nor is its method of manufacture. Thus for example the trunk copolymers disclosed in British Pat. No. 801,528 at page 1, lines 56 to 67 are suitable. A trunk polymer suitable for the invention is any polymer capable of producing under ionizing radiation free radicals, as is well understood and conventional in the art. Suitable trunk polymers are thus, for instance, polyolefines, for example polyethylene, polypropylene or 4-methylpentene-1; halogenated polyolefines, for example polytetrafluoroethylene or polytrifluoromonochloroethylene; polyimides or polyparaxylylene. In bioassay, chemical processes, e.g. separation and purification and in medical applications, high density of the steroid-reactive groups on the surface and virtual absence of reactive groups inside the polymeric material is highly desirable; we have found that copolymers satisfying this requirement can be made only when the nucleus polymer is not dissolved, solvated or swelled by the reaction medium and/or the monomer. Nucleus polymers particularly suitable for our invention are therefore the solvent resistant polymers of the fluorinated ethylenes, particularly polytetrafluoroethylene and polytrifluoromonochloroethylene. Since one of the advantages of our copolymers is that the trunk polymer may be shaped to the desired configuration before grafting, it must not be dissolved during the grafting step and/or the introduction of the steroid-reactive group. Consequently during the grafting or introduction of the steroid-reactive group the reaction medium, for example a solvent, is chosen such that it does not dissolve the trunk polymer.

By nucleus we mean any shape or body capable of forming the interior of a finished particulate body. Thus powder particles, irregular particles, spheres or cubes are suitable but larger articles, for example film, tubes, discs or rods are included.

By carbonylic steroid we mean compounds containing the perhydrocyclopentenophenanthrene nucleus having the skeleton structure I

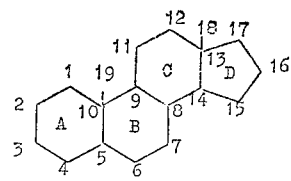

or a modification thereof as set out below and numbered in the conventional manner and containing as a substituent at least one carbonyl group or a group which may be converted to a carbonyl group as set out below. Thus they may include certain of the sterols, vitamins, bile acids, sex hormones, andrenocortical hormones, cardiac glycosides, butadienolides for example bufotalin, sapogenins for example hecogenin, and alkaloids. In some instances the skeleton structure I is further modified. For example in some naturally occurring steroids such as the D-homo-steroids the D ring is six-membered; and in some alkaloids, e.g. the $C_{27}$ alkaloid Jervine, depicted as

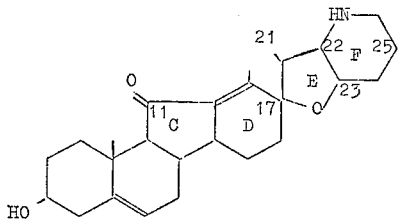

the C ring is 5-membered and the D ring is 6-membered.

Amongst these steroids there may be mentioned for example $\Delta^5$-cholestene-3$\beta$-ol (cholesterol), and
$\Delta^{5:7:10(19)}$-cholestatriene-9:10-seco-3$\beta$-ol (Vitamin $D_2$) (the hydroxy group of which may be converted into a carbonyl group);
3$\alpha$,7$\alpha$,12$\alpha$-trihydroxycholanic acid (cholic acid);
$\Delta^{1,3,5(10)}$-estratriene-3-ol-17-one (estrone);
$\Delta^4$-androstene-17$\beta$-ol-3-one (testosterone);
$\Delta^4$-androstene-3-one-17$\beta$ acetate (testosterone acetate);
$\Delta^4$-androstene-3:17-dione (androstenedione);
$\Delta^5$-androstene-3$\beta$-ol-17-one (dehydroepiandrosterone);
5$\beta$-androstane-3$\alpha$-ol-17-one(etiocholanolone);
$\Delta^4$-pregnene-3:20-dione (progesterone);
$\Delta^4$-pregnene-11$\beta$,17$\alpha$,21-triol-3:20-dione (cortisol);
$\Delta^4$-pregnene-18-al-11$\beta$,21-diol-3:20-dione (aldosterone),
$\Delta^4$-pregnene-18-al-11$\beta$,21-diol-3:20-dione (aldosterone), and
3$\beta$:14$\beta$-dihydroxy-5$\beta$-card20(22)enolide (digitoxigenin).

There may also be included steroids which contain no carbonyl groups, but which contain other groups which may be converted to carbonyl groups. Thus certain steroids containing hydroxy groups may be treated as described in Belgian Pat. 706,599 so as to convert at least some of the hydroxy groups to carbonyl groups. Other reactive steroids are degradation products of steroids, for example the degradation products of bile acids to $C_{20}$ and $C_{21}$ steroids containing a carbonyl group.

By a group reactive with carbonylic steroids we mean a group which, directly or indirectly, under mild conditions under which the group and the steroid itself are not degraded, is capable of forming a chemical bond with a steroid as defined. By directly we mean that the reactive group of the copolymer is itself capable of reacting with the carbonyl group of the steroid. By indirectly we mean that the reactive group of the copolymer is first converted to a derivative capable of reacting with the carbonyl group of the steroid. Amongst compounds providing steroid reactive groups there may be mentioned hydrazines, thiosemicarbazides and Girard reagents.

Copolymers wherein polystyrene is grafted on to a nucleus polymer of polytetrafluoroethylene will be referred to hereinafter as poly(tetrafluoroethylene-g-styrene)-. When the polystyrene is substituted, for example with an amino group, the product will be referred to hereinafter as for example poly(tetrafluoroethylene-g-amino styrene).

By multiplicity of mer units we mean that polymeric graft chains are formed; their chain length is not critical; it can be controlled in a manner known "per se" and both short and long graft chains are useful.

Methods of preparing the graft copolymers into which the steroid-reactive group is to be introduced, for example methods of preparing polystyrene grafts on polyethylene, polypropylene, polytetrafluoroethylene, polytrifluoromonochloroethylene, etc., are known, e.g. from British Pat. No. 801,528. The surface graft copolymers of this invention are prepared by graft polymerisation in the presence of ionising radiation as understood in the art at high dosage rates; this term includes (British Pat. No. 801,528, page 1, at lines 49–56) "$\beta$-rays, $\gamma$-rays, neutrons, accelerated electrons and heavy particles, X-rays, etc. or mixtures of them. Convenient sources for such radiation may be furnished by atomic piles, electron or particle accelerators, radioactive isotopes and X-ray equipment." The polymerisation may be carried out by all the methods known, for example in a liquid medium using an excess of monomer to be grafted on or an inert liquid, for example methanol as cited in Journal of Applied Polymer Science 7, 245–250 (1963); or by coating the trunk polymer with a film of the co-mer; or by reacting the trunk polymer with a vaporised co-mer. In our graft copolymers the steroid-reactive substituents are concentrated in a layer surrounding the surface of the nucleus polymer; such copolymers exhibit high reactivity and reaction rate and retain the characteristics of the trunk polymer nucleus. Consequently the trunk polymer is selected to provide the properties required for the application, for example inertness to the reaction medium, biological acceptability, stability and strength.

Reaction conditions effecting surface grafting only are required: absence of solvents; alternatively the use of liquid media which are non-solvents for the trunk polymer; the use of co-mers in which the trunk polymer is not soluble; and trunk polymers which are resistant to the penetration of the liquid or gaseous co-mer and to any solvent used such as polymers which have been insolubilized by cross-linking or inert polymers, particularly polytetrafluoroethylene (P.T.F.E.) and polytrifluoromonochloroethylene, are used.

Chapiro (J. Polymer Sci., 34, 481 (1959)) has already established that for the system P.T.F.E.-styrene at high radiation dose-rates surface-grafting predominates whereas stepwise grafting which penetrates gradually into the polymer occurs at low dose rates. Irradiation achieving surface grafts according to this invention is defined as irradiation at dosage levels from 100,000 to 300,000 rads per hour.

We also provide a process comprising graft polymerising a vinyl aromatic compound of the formula

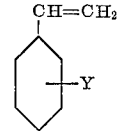

wherein Y is one or more optional substituent which is nonsteroid reactive on to the surface of a solid shaped polymeric nucleus by irradiation with a source of high energy under conditions producing surface grafts as hereinbefore defined and introducing into the aromatic groups of said surface graft copolymer maintained in its solid state one or more group X which is steroid reactive as hereinbefore defined.

When the steroid reactive group is hydrazino the preferred process of forming it comprises: firstly nitrating a multiplicity of phenyl groups in the solid graft copolymer to form the insoluble mono-nitro derivative; secondly reducing at least part of said nitro groups to amino groups; thirdly diazotising the amino group and reducing the latter to a hydrazino group in a manner known "per se."

Thiosemicarbazido groups may be introduced into our copolymers by reacting a haloalkyl, e.g. chloromethyl, substituted copolymer with thiosemicarbozide in the presence of a solvent, preferably at temperatures up to the reflux temperature of the mixture.

Alternatively an amino substituted copolymer may be reacted with thiophosgene and hydrazine to form a thiosemicarbazido substituted copolymer. The so-called Girard reagents may be obtained by reacting a halomethyl substituted copolymer, for example poly(tetrafluoroethylene-g-chloromethyl styrene) with a dialkylamine, e.g. dimethylamine, followed by treatment with an alkylhalocarboxylate, e.g. ethylchloroacetate, and then with hydrazine to give a substituted copolymer containing for example a —CH$_2$—N$^+$(CH$_3$)$_2$—CH$_2$—CONH·NH$_2$Cl$^-$ group.

Alternatively a halomethyl substituted copolymer may be reacted with N,N-dimethylglycine followed by thionylchloride, POCl$_3$, PCl$_5$ or phosgene together with hydrazine to give a Girard reagent.

We also provide a process of reacting steroids as above defined with our graft copolymers having groups reactive with carbonylic steroids. We also provide a surface graft polymeric preparation comprising a surface graft copolymer according to our invention and at least partly chemically bonded to the surface thereof a carbonylic steroid as defined.

Our graft copolymers may be used whenever a chemical bond of a steroid onto the surface of a plastic material is desired. The classical prior art separation of steroid mixtures is based on physical separation for example separations dependent on differences in volatility, solubility in liquids, crystallization, partition between two solvents and the like. Such separations are often time consuming and non-specific; by contrast the use of our copolymers enables steroids to be separated easily with high selectivity, purity and in a convenient, namely solid, form and in comparatively short time. Such use is commercially important in processes where a particular steroid has to be separated in a purified form from naturally occurring or sythetic mixtures.

Accordingly we provide a process which comprises firstly adding a graft copolymer according to our invention to a mixture of carbonylic and non-carbonylic steroids, secondly reacting said graft copolymer with the carbonylic steroid, thirdly separating the copolymer-steroid complex so formed from the mixture and optionally fourthly recovering the steroid from the said copolymer-steroid complex. When the graft copolymer is reacted with the carbonylic steroid the reaction may be carried out in a medium consisting of a buffer solution, for example of sodium acetate in a mixture of ethanol and water to which hydrochloric acid has been added. Conveniently the water content of the buffer solution may be between 40 and 90 parts by volume, preferably between 50 and 70 parts by volume, per 100 parts by volume of the buffer solution and hydrochloric acid should be added to the buffer solution in amount so that the pH of the reaction medium is between 0.5 and 6, preferably between 1 and 3.5. This process is useful in the manufacture of steroids.

Alternatively the copolymer may be added to a carbonylic steroid or a mixture of carbonylic and non-carbonylic steroids and reacted with the carbonylic steroid in media other than that disclosed above. Thus the steroid may be reacted in an aqueous medium adjusted to a pH from 2.5 to 6 by the addition of a carboxylic acid, for example acetic or citric acid, optionally and preferably in the presence of from 0 to 60 parts by volume of a lower water soluble alcohol, for example ethanol, per 100 parts by volume of the reaction medium.

Accordingly we provide a process which comprises firstly adding a graft copolymer according to our invention to a carbonylic steroid, secondly reacting said graft copolymer with the carbonylic steroid in an aqueous reaction medium, thirdly separating the copolymer-steroid complex so formed from the medium and optionally fourthly recovering the steroid from the said copolymer-steroid complex, characterised in that the medium is adjusted to a pH in the range from 2.5 to 6 by the addition of a water soluble carboxylic acid.

Another use for the copolymers of our invention lies in the assay of mixtures containing steroids as active ingredients for example tablets, pills and medicinal preparations where our copolymers enable a rapid, accurate and reproducible estimate to be made of the active ingredient present in the mixture. Such determinations are frequently used in assays in the study of cancer, animal physiology, steroid levels in biological fluids and biomedical investigations in general.

The surface reactivity of our graft copolymers is advantageous. It increases the rate of reaction with steroids and increases the ease of separation of steroids where a filtration process is involved. Our copolymers may be prepared in various shapes; not only may they be in the form of powders or irregular particles, but the positioning of virtually all of the reactive groups on the surface makes it also possible to prefabricate desired shapes of plastic articles for example tablets, discs, pellets, beads or rods; hollow articles such as tubes, beakers, crucibles or cups; porous shaped articles, semi-permeable membranes, reactive diaphragms, stirrers, or filters with reactive surfaces ready for reaction with steroids or alternatively with chemically bonded surfaces of steroids.

Accordingly we provide a process of producing graft copolymers according to our invention wherein the steroid reactive graft copolymer is prefabricated in a solid or hollow or porous shape. Whilst the above description refers to copolymers, it is within the scope of our invention to include also the salts of our copolymers, for example the hydrochloride salts.

The invention is illustrated by, but not limited to, the following examples in which all parts and percentages are expressed by weight unless otherwise stated.

EXAMPLE 1

Polytetrafluoroethylene powder, Fluon G.4 (registered trademark) (250 gm.) was sieved through a British Standard Specification 10 mesh sieve and transferred to a 2000 ml. cylindrical glass reaction vessel. Styrene monomer (500 ml.) which had been distilled under reduced pressure in an atmosphere of nitrogen was added to the polytetrafluoroethylene and the mixture was freeze degassed three times at a pressure of 0.01 mm. Hg using liquid nitrogen as the coolant. The reaction vessel was placed at the centre of a circular arrangement of eight 250 curie Cobalt $\gamma$ emitter radiation sources. Irradiation was carried out at ambient temperature for three hours during which the dose rate in the reaction vessel was maintained at $1.75 \times 10^5$ rads per hour. The reaction mixture was then filtered and washed with hot benzene until free of homopolymerised styrene. The weight of the irradiated product (after drying in vacuo at 60° C.) was 269.8 gm., equivalent to a graft of polystyrene of 7.3%. The presence of polystyrene in the graft copolymer was determined by infra-red spectroscopy. This example produced predominantly a surface graft copolymer poly(tetrafluoroethylene-g-styrene) which is an intermediate to our graft copolymers. It demonstrates the high degree of surface grafting attainable at fast rates when high irradiation dose rates are used.

EXAMPLE 2

Concentrated nitric acid 69.7% (262 ml.) and concentrated sulphuric acid 96% (98 ml.) were mixed, and the mixture placed in a 2000 ml. flask fitted with a stirrer and thermometer. The flask was placed in an icebath, the contents thereof cooled to 0° C., and portions of the poly(tetrafluoroethylene-g-styrene) obtained in Example 1 were slowly added to the stirred acid mixture until 150.6 gm. of copolymer had been dispersed in the acid mixture. The dispersion was stirred for a further 30 minutes at 0° C., after which its temperature was allowed to rise to about 20° C. and stirring at that temperature was continued for a further 30 minutes. The dispersion was then heated to about 50° C. and stirring continued for a further 1½ hours. A further 180 ml. of the nitric acid-sulphuric acid mixture referred to above was added to the dispersion and stirring continued for a further 1½ hours at a temperature of about 50° C. The contents of the flask were cooled, filtered and the solid product retained on the filter was washed with distilled water to remove acidity, then with methanol, and finally dried in a vacuum oven at 60° C. The poly(tetrafluoroethylene - g - nitrostyrene) 155.6 g.

thus obtained was pale yellow in appearance, and its colour darkened upon exposure to sunlight. The weight increase indicated that about one nitro group had been introduced per aromatic ring present in the graft copolymer with a small proportion of the aromatic rings being polynitrated. The presence of aromatic nitro groups in the product was confirmed by infra-red spectroscopy. The product so obtained is an intermediate to our graft copolymers.

EXAMPLE 3

Powdered tin (180 gm.) was washed free of grease with diethyl ether, dried and mixed with the poly(tetrafluoroethylene-g-nitrostyrene) from Example 2 (100 gm.) in a 2000 ml. flask fitted with a stirring device and a condenser. Concentrated hydrochloric acid 35% (400 ml.) was slowly added to the contents of the flask which were stirred during the acid addition. The contents of the flask were heated to about 100° C. and maintained in a stirred condition for 4 hours at this temperature. A further 200 ml. of concentrated hydrochloric acid was added to the contents of the flask and heating at about 100° C. continued for a further 2 hours. The contents of the flask were then cooled to ambient temperature and stirring continued for a further 16 hours. The reaction mixture was then filtered and the resultant solids washed free of chloride with distilled water. The product which was off-white in colour was treated with a solution of 50 g. sodium hydroxide in 200 ml. of water whereupon the colour of the product changed to a pink shade. The residual solids were filtered, washed thoroughly with distilled water till the washings were neutral then twice with methanol and dried in vacuo at 60° C. The yield of dried product was 98.1 gm. The change from the original weight indicated that substantially all of the nitro groups had been converted to amino groups. The presence of aromatic amino groups in the graft copolymer was confirmed by infra-red spectroscopy. The poly(tetrafluoroethylene-g-amino styrene) is an intermediate to our copolymers.

EXAMPLE 4

The polytetrafluoroethylene powder of Example 1 was replaced by powdered polytrifluoromonochloroethylene. There was thus obtained by conditions analogous to those described in Example 1 poly(trifluoromonochloroethylene-g-styrene) in powdered form. This was then converted to poly(trifluoromonochloroethylene-g-amino styrene) by the methods analogous to those described in Examples 2 and 3.

EXAMPLE 5

The poly(trifluoromonochloroethylene-g-amino styrene) obtained in Example 4 was sieved and 6.9 g. of that portion passing a 100 mesh B.S.S. sieve was suspended in 65 ml. concentrated HCl in a 600 ml. beaker and the suspension was stirred vigorously at 0° C. 60 g. of ice flakes was added to the suspension. To this suspension a solution, precooled to 0° C., of 18 g. sodium nitrite, in 40 ml. water was added at such a rate that the temperature of the resultant mixture did not exceed 3° C. The mixture was then stirred for a further 5 hours at 0° C. and the diazotised copolymer mixture was allowed to stand for 16 hours at a temperature not above 5° C. 25 g. sodium hydroxide was dissolved in 250 ml. water in a 1000 ml. beaker and 56 g. sodium metabisulphite added. The mixture was stirred vigorously until the solid had dissolved and the solution was cooled to 25° C. Small quantities of sodium metabisulphite were then added to the stirred solution until the solution was neutral to phenolphthalein indicator. A further 6 g. of sodium metabisulphite was then introduced, with stirring, the resultant solution was cooled to 5° C., then 30 g. of ice was added to it. The diazotised copolymer mixture at 5° C., prepared above, was then poured quickly into the sodium metabisulphite solution and the stirred mixture was then slowly heated to 70° C. and maintained at this temperature for 2 hours, acidified with 25 ml. concentrated HCl and the resultant solution stirred at 60° C. for 16 hours. A further 250 ml. concentrated HCl was then added and the mixture was cooled to room temperature. The solid product was removed from the mixture by filtration, washed thoroughly with dilute HCl and suspended in a stirred solution of 25% sodium hydroxide for 1 hour. The resultant product was then separated by filtration, washed firstly with water then with methanol and dried at 37° C. The red coloured powder so obtained weighed 7.36 g. and by infrared spectroscopy was shown to contain hydrazino groups. There was thus obtained poly(trifluoromonochloroethylene-g-hydrazino styrene) suitable for reaction with steroids.

EXAMPLE 6

This example demonstrates the preparation of poly(tetrafluoroethylene-g-styrene) in shaped form.

Small discs ⅛ in. in diameter were punched from 10/1000 in. thick polytetrafluoroethylene tape and washed in boiling benzene. The discs, 200.48 gm., were dried in vacuo and transferred to a 1 litre Pyrex glass reaction vessel fitted with a stirrer and an "inert-gas purge" system. The discs were covered with commercially available inhibited styrene monomer (600 ml.) and the reaction vessel purged with oxygen-free nitrogen for 1 hour. The vessel and contents were then irradiated at room temperature with $Co^{60}$ $\gamma$-rays for 6 hours at a dose-rate of $1.9 \times 10^5$ rads per hour with stirring and nitrogen purge. The resultant discs were then filtered off, washed with benzene, extracted in a Soxhlet apparatus with hot benzene until constant in weight (after 72 hours) and fiinally dried in vacuo at 60° C. The final weight of the discs (205.21 gm.) indicated the presence of 2.33% grafted polystyrene. The presence of polystyrene in the graft copolymer was confirmed by infra-red spectroscopy. The product so obtained is an intermediate to our graft copolymers in shaped form.

EXAMPLE 7

This example demonstrates the preparation of poly(tetrafluoroethylene-g-nitro styrene) in shaped form.

Concentrated sulphuric acid (224 ml.) and concentrated nitric acid (576 ml.) were mixed in a 1 litre Pyrex reaction vessel and cooled to 0–5° C. and poly(tetrafluoroethylene-g-styrene) discs (203.97 gm.), obtained in Example 6, were added. The mixture was stirred at 0–5° C. for 30 minutes, then at room temperature for 30 minutes, and finally at 50° C. for 3 hours. After cooling, the resultant discs were thoroughly washed with water and then with methanol and dried in vacuo at 60° C. The final weight of the discs (206.03 g.) after nitration indicated that about one nitro group had been introduced per aromatic ring present in the graft copolymer with a small proportion of the aromatic rings being polynitrated. The presence of aromatic nitro groups in the product was confirmed by infra-red spectroscopy. The product so obtained is an intermediate to our graft copolymers in shaped form.

EXAMPLE 8

This example demonstrates the prepartion of poly(tetrafluoroethylene-g-amino styrene) in shaped form.

205.05 g. of poly(tetrafluoroethylene-g-nitro styrene) discs obtained in Example 7 were equilibrated in a 1 litre Pyrex reaction vessel in 500 ml. of dioxan for 1 hour at room temperature and powdered tin (25 g.) followed by concentrated hydrochloric acid (170 ml.) added with stirring. The mixture was then heated at reflux temperature for 11 hours. After cooling, the resultant discs were washed thoroughly with dioxan/concentrated HCl mixture (90:10) until free of tin salts, then with dioxan followed by two further washings with ammoniacal dioxan. Dioxan washing was continued until the washings were free of chloride to yield 203.68 g. of product. The change from the original weight indicated that substantially all of the nitro groups had been converted to amino groups. The presence of aromatic amino groups in the graft copolymer was confirmed by infra-red spectroscopy. The product so obtained is an intermediate to our graft copolymers in shaped form.

EXAMPLE 9

This example demonstrates the preparation of our graft copolymers in a porous shaped form. Polytetrafluoroethylene ("Fluon" G.4) powder was sieved through a 30 B.S.S. sieve. Polymethyl methacrylate ("Diakon" M.G., Registered Trademark) powder was sieved to break down compacted lumps. Equal weights of the sieved powders were placed in a mixing vessel so as to occupy ⅓ of its volume and the mixing vessel was turned end over end at 30 r.p.m. for 15 minutes. The powder mixture (25 gm.) was placed in the die cavity of a commercially available tablet making machine and submitted to a pressure of 1,500 lb./sq. in. for 1 minute at ambient temperature. The compressed powder was removed from the die cavity and placed in an oven, maintained at a temperature of 380° C., for 90 minutes. The sintered porous shaped article was then removed from the oven and cooled to ambient temperature, and placed in a reactor. Nitrogen gas was bubbled through two gas wash-bottles each containing a styrene monomer/water mixture (200 ml. 1:1). The wash-bottles and contents were kept at 50° C. by immersion in a water bath. The styrene/water saturated nitrogen was then passed into the reactor and directed so that it came into contact with the surfaces of the sintered porous shaped article. The flow of styrene/water saturated nitrogen on to and through the sintered porous shaped article was maintained for one hour, and then continued for a further six hours during which latter period the reactor and its contents were irradiated with $\gamma$-rays from a Cobalt 60 source at a dose rate of $1.7 \times 10^5$ rads/hr. During the irradiation the reactor and its contents were maintained at a temperature of 60–65° C. After irradiation the resultant porous shaped article was washed thoroughly with hot benzene until free of homopolymer and dried in vacuo at 65° C. The final weight of the dried article, 25.30 g., indicated the presence of 1.18% grafted polystyrene. The presence of polystyrene in the porous shaped article was confirmed by infra-red spectroscopy. The poly(tetrafluoroethylene-g-styrene) thus obtained was then treated by the methods used in Examples 7 and 8 to give a porous shaped copolymer of poly(tetrafluoroethylene-g-amino styrene).

EXAMPLE 10

Example 5 was repeated, but the powdered poly(trifluoromonochloroethylene-g-amino styrene) was replaced by the product obtained in Example 9. There was thus obtained by conditions analogous to those described in Example 5 poly(tetrafluoroethylene-g-hydrazino styrene) in a porous shaped form suitable for reaction with steroids.

EXAMPLE 11

Example 5 was repeated but the powdered poly(trifluoromonochloroethylene-g-amino styrene) was replaced by the product obtained in Example 8. There was thus obtained by conditions analogous to those described in Example 5 poly(tetrafluoroethylene-g-hydrazino styrene) in a shaped form suitable for reaction with steroids.

EXAMPLE 12

This example demonstrates the reaction of carbonylic steroids with our copolymers. An ethanol solution containing 4.6 m$\mu$g. of radioactive 4-$^{14}$C-testosterone was pipetted into a tapered test tube and placed in a water bath maintained at a temperature of about 55° C. The ethanol was removed by evaporation from the test tube by means of an air stream. The tube containing the steroid was cooled to room temperature, 30 mg. of poly(trifluoromonochloroethylene-g-hydrazino styrene) in powdered form was added to the tube followed by 0.2 ml. of 4% v./v. HCl in ethanol. The tube was stoppered and shaken vigorously for 16 hours at room temperature. When removed from the shaker the copolymer-steroid complex which had formed settled rapidly to the bottom of the tube. The supernatant liquid containing unreacted 4-$^{14}$C-testosterone was transferred to a liquid scintillation spectrometer counting vial. The copolymer-steroid complex was vigorously washed twice, each time with 0.5 ml. of ethanol, and the washings were transferred to the counting vial. The combined liquids in the counting vial were evaporated by means of an air stream and the residue examined quantitatively for radioactivity in a liquid scintillation spectrometer thus enabling the amount of steroid not reacted with the copolymer to be determined. By difference it was calculated that the copolymer had reacted with approximately 50% of the steroid originally present.

EXAMPLE 13

This example demonstrates the recovery of the steroid from our copolymer-steroid complexes. The copolymer-steroid complex obtained in Example 12 was added to 0.3 ml. of 4% hydroxylamine in ethanol and the mixture was shaken for 16 hours at room temperature. The amount of steroid recovered in the form of its oxime in the ethanol was then determined using a liquid scintillation spectrometer. Thee steroid oxime was identified by thin layer and gas-liquid chromatograph as the oxime of 4-$^{14}$C-testosterone. The yield was approximately 60%.

EXAMPLE 14

Example 13 was repeated bu the hydroxylamine of that example was replaced by a similar quantity of methoxyamine. The yield of O-methyloxime of 4-$^{14}$C-testosterone was similar to that of Example 13.

EXAMPLES 15 TO 23 INCLUSIVE

Examples 12 and 14 were repeated but the 4-$^{14}$C-testosterone of those examples was replaced by 4-$^{14}$C-radioactive steroids as set out in Table I. The yields obtained are set out in Table I.

TABLE I

| Ex. | Steroid class according to number of carbon atoms/mol | Steroid | Steroid mass mixed with copolymer reagent (m$\mu$g.) | Percent steroid retained on copolymer | Percent of retained steroid recovered as methyl oxime |
|---|---|---|---|---|---|
| 15 | $C_{19}$ | $\Delta^4$-androstene-3-one-17$\beta$ acetate (testosterone acetate). | 8 | 48 | 50 |
| 16 | | $\Delta^4$-androstene-3:17-dione (androstenedione). | 6.4 | 63 | 16 |
| 17 | | $\Delta^5$-androstene-3$\beta$-ol-17-one (dehydroepiandrosterone). | 1.06 | 23 | 59 |
| 18 | | 5$\beta$-androstane-3$\alpha$-ol-17-one (etiocholanolone). | 0.08 | 20 | 60 |
| 19 | $C_{18}$ | $\Delta^{1,3,5,(10)}$-estratriene-3-ol-17-one (estrone). | 1.6 | 52 | 65 |
| 20 | $C_{21}$ | $\Delta^4$-pregnene-3:20-dione (progesterone). | 8.7 | 50 | 70 |
| 21 | | $\Delta^4$-pregnene-11$\beta$,17$\alpha$,21-triol-3:20-dione (cortisol). | 9.8 | 45 | 23 |
| 22 | | $\Delta^4$-pregnene-11$\beta$,21-diol-3:20-dione (corticosterone). | 8.6 | 55 | 16 |
| 23 | | $\Delta^4$-pregnene-18-al-11$\beta$,21-diol-3:20-dione (aldosterone). | 6.1 | 58 | 25 |

EXAMPLE 24

Example 12 was repeated but the poly(trifluoromonochloro-ethylene-g-hydrazine styrene) of that example was replaced by an equivalent amount of its hydrochloride salt; the composition of the reaction medium was altered to include buffer mixtures, the pH of which was varied by addition of hydrochloric acid. The reaction time was varied also. These latter variations, the pH of the reaction medium as shown by millivolt potentials, and the yield of copolymer-steroid complex obtained are set out in Table II.

TABLE II.—EFFECT OF THE ADDITION OF BUFFER MEDIA TO THE REACTION MEDIUM, AND VARIATION OF REACTION TIME ON THE YIELD OF THE COPOLYMER-STEROID COMPLEX

| Composition of buffer medium | pH of reaction medium | Reaction time (hrs.) | Yield of copolymer-steroid complex, percent |
|---|---|---|---|
| A) 0.1 M sodium acetate/60% v./v. water in ethanol. | 1 | 16 | 98 |
| (B) do | 6 | 16 | 98 |
| (C) 0.1 M sodium acetate/acetic acid/60% v./v. water in ethanol. | 2.8 | 2 | 88 |
| (D) do | 2.8 | 16 | 100 |
| (E) 0.4 M sodium acetate/acetic acid/60% v./v. water in ethanol. | 2.8 | 2 | 97 |
| (F) do | 2.8 | 16 | 100 |
| (G) 0.1 M sodium acetate/60% v./v. ethanol in water. | 2.8 | 2 | 80 |
| (H) 0.1 M sodium acetate/ethanol with no water present. | 2.8 | 16 | 45 |
| (J) 0.1 M sodium acetate/ethanol/40% v./v. water present. | 2.8 | 16 | 85 |
| (K) 0.1 M sodium acetate/ethanol/60% v./v. water present. | 2.8 | 16 | 98 |
| (L) 0.1 M sodium acetate/ethanol/90% v./v. water present. | 2.8 | 16 | 88 |

EXAMPLE 25

This example demonstrates the introduction of chloromethyl groups into our graft copolymer.

Poly(tetrafluoroethylene-g-styrene) (50.0 gm.) containing 2.72 gm. grafted polystyrene was placed in a 3-necked, 500 ml. round-bottomed flask fitted with a stirrer, thermometer and condenser. Chloromethyl methyl ether (100 ml.) was added and the mixture stirred for 1 hour at room temperature. To the stirred mixture was slowly added anhydrous stannic chloride (3.0 ml.) in chloromethyl methyl ether (20.0 ml.).

The flask was then slowly warmed to 60° C. until reflux commenced. The mixture was stirred under reflux for 1½ hours or until the polymer showed signs of turning a pinkish colour. After cooling, the mixture was filtered and washed with aqueous dioxan, then aqueous dioxan containing 10% v./v. of concentrated hydrochloric acid, and finally with pure dioxan. Washing was continued using dioxan/methanol mixtures of decreasing dioxan content until the polymer was finally washed with pure methanol. The (polytetrafluoroethylene-g-chloromethyl styrene) of a pale yellow colour, was dried in vacuo at 60° C. The final weight of product was 51.5 g. The poly-(tetrafluoroethylene-g-chloromethyl styrene) is useful as an intermediate to our graft copolymers.

EXAMPLE 26

This example demonstrates the introduction of chloromethyl groups into our graft copolymer in a proportion less than that obtained in Example 25.

Poly(trifluoromonochloroethylene - g-styrene) (210.5 g..) containing 84.2 g. grafted polystyrene was placed in a 3-necked, 2 litre round-bottomed flask fitted with a stirrer, thermometer, condenser and drying tube. Dry chloroform (800 ml.) was added and the mixture stirred for 1 hour at room temperature. The flask was cooled in an ice bath to 5° C.

A mixture of chloromethyl methyl ether (200 ml.) and anhydrous stannic chloride (20 ml.) was prepared, cooled and added to the mixture. After this addition the temperature in the flask rose to 20° C.; the ice bath was removed and the mixture was stirred for a further 3 hours at room temperature.

The polymer was then filtered and washed with dioxan to remove the chloroform, then with aqueous dioxan containing 10% v./v. of concentrated hydrochloric acid to remove the stannic chloride, the with aqueous dioxan until free of chloride ion and finally with pure dioxan. Washing was continued using dioxan/methanol mixtures of increasing methanol content until the polymer was finally washed with pure methanol. The poly(trifluoromonochloroethylene-g-chloromethyl styrene) of a pale yellow colour was dried in vacuo at 60° C. to a constant weight. The final weight of the product was 220.9 g., corresponding to approximately 22% of the phenyl groups being chloromethylated. The poly(trifluoromonochloroethylene-g-chloromethyl styrene) so obtained is useful as an intermediate to our graft copolymers.

EXAMPLE 27

This example demonstrates the introduction of thiosemicarbazido groups into our graft copolymer.

Poly(trifluoromonochloroethylene-g-chloromethyl styrene) (50.0 g.) was placed in a 3-necked, 500 ml. round-bottomed flask fitted with a stirrer, thermometer and condenser. Dioxan (250 ml.) was added and the mixture refluxed for 4 hours with stirring on a waterbath.

Thiosemicarbazide (58 g.) was slurried in dioxan (100 ml.) and added to the flask. The mixture was kept at 90° C. for a further 4 hours with stirring. The flask was then cooled to room temperature, the polymer filtered and washed with dioxan, ethanol and finally with hot water. After preliminary drying on the filter the product was dried in vacuo at 60° C. The final weight of the copolymer obtained was 52 g.

EXAMPLE 28

This example demonstrates the introduction of a —$CH_2$—$N^+(CH_3)_2$—$CH_2CONHNH_2Cl^-$ group into our graft copolymer.

Poly(trifluoromonochloroethylene-g-chloromethyl styrene) (100.0 g.) obtained from Example 26 and dioxan (300 ml.) were placed in a 1-necked, 500 ml. round-bottomed flask. The flask was stoppered and shaken for 1 hour on a laboratory shaker. 100 ml. dimethylamine solution (33% w./v. in ethanol) was added and the stoppered flask shaken for 7 days. The polymer was then filtered and washed with dioxan, dioxan/water mixtures of increasing water content, pure water and finally with 0.5 N NaOH until the filtrate was free of chloride. Washing was continued with water until the filtrate was neutral and the polymer was finally washed with absolute ethanol.

After removal of excess ethanol by filtration the wet polymer was transferred to a 3-necked, 500 ml. round-bottomed flask fitted with a stirrer, thermometer and condenser. A mixture of absolute alcohol (100 ml.) and ethyl chloro acetate (30 g.) was prepared and added to the flask. Stirring was commenced and the flask was slowly heated to 80° C. on a waterbath. After 2 hours at 80° C., the flask and contents were cooled to room temperature and hydrazine hydrate (14 g., 100%) was slowly added with vigorous stirring. During the addition the temperature rose from 19° C. to 25° C. The mixture was stirred for a further 3 hours at room temperature. The polymer was filtered and washed with ethanol and water until the filtrate was free of chloride, then again with ethanol before being dried in vacuo at 60° C. The product was of off-white colour and weighed 109.4 g. The presence of amide groups was established by infra-red spectroscopy. There was thus obtained a graft copolymer with reactive groups suitable for reaction with steroids.

EXAMPLE 29

A strip of 0.002″ thick "Kapton" (registered trade name) polyimide film (157.7 mgm.) was suspended in re-distilled styrene monomer (50.0 ml.) and the mixture freeze-degassed twice in liquid nitrogen to 0.01 mm. Hg. The mixture was irradiated at room temperature for 6 hours at a dose-rate of $1.75 \times 10^5$ rads per hour. After irradiation the film was extracted in boiling benzene for 3 days until free of homopolymer. The film was then dried in vacuo at 65° C. There was no apparent change in the appearance of the irradiated film but the resultant weight (166.2 mgm., representing 5.1% polystyrene) and the infra-red spectrum of the product showed that grafting had occurred.

There was thus obtained a "Kapton" film grafted with polystyrene suitable for conversion to the hydrazino derivative by methods analogous to those described in Examples 7, 8 and 11.

EXAMPLE 30

A strip of 0.002″ thick "Parylene" C (registered trade name) poly(monochloro-p-xylylene) film (197.9 mgm.) was suspended in re-distilled styrene monomer (60.0 ml.) in a 250 ml. reaction vessel and the mixture freeze-degassed twice in liquid nitrogen to a pressure of 0.01 mm. Hg. The reaction vessel and contents were then irradiated at room temperature for 6 hours at a dose-rate of $1.75 \times 10^5$ rads per hour. After irradiation the film was extracted in hot benzene for 3 days until free of homopolymer and finally dried in vacuo at 60° C. for 36 hours. The final weight of the film (292.1 mgm.) indicated that 32.3% polystyrene had graft copolymerised. The presence of grafted polystyrene was confirmed by infra-red spectroscopy. There was thus obtained poly(monochloro-p-xylylene-g-styrene) film suitable for conversion to poly (monochloro-p-xylylene-g-hydrazino styrene) by methods analogous to those described in Examples 7, 8 and 11.

EXAMPLE 31

The following example demonstrates the preparation of poly(propylene-g-styrene) in the form of a shaped article.

A shaped article of poly(propylene) in the form of a 100 ml. beaker (19.29 gm.) was immersed in a mixture of styrene monomer (200 ml.) and methanol (200 ml.) in a 1-litre wide-necked flask. The flask and contents were purged with oxygen-free nitrogen for 30 minutes at room temperature with the gas inlet tube arranged so as to keep the beaker fully immersed in the monomer solution. The reaction flask was then sealed and placed at the centre of a circular arrangement of eight 250 Curie $CO^{60}$ γ-emitter radiation sources. Irradiation was performed at room temperature for 2 hours during which the dose-rate in the reaction flask was maintained at $1.75 \times 10^5$ rads/hr. The beaker was then removed from the flask, continuously washed with benzene until free of homopolymer and dried in vacuo.

The final weight of the irradiated beaker (20.35 gm.) indicated the presence of 5.2% grafted polystyrene. Infra-red spectroscopy of a small section cut from the beaker confirmed the presence of grafted polystyrene. There was thus obtained poly(propylene-g-styrene) in shaped form suitable for conversion to a shaped copolymer according to our invention.

EXAMPLE 32

The poly(propylene-g-styrene) beaker obtained from Example 31 was nitrated according to the conditions analogous to those of Example 7 except that the grafted beaker itself was used as the reaction vessel. There was thus obtained a shaped article in the form of a beaker having poly(propylene-g-nitro styrene) as its inner surface suitable for conversion to a shaped article having poly(propylene-g-hydrazino styrene) as its inner surface using for example reaction conditions analogous to those described in Examples 8 and 11.

EXAMPLE 33

Polyethylene beads available under the registered trade name of "Rigidex" were treated in a manner analogous to that described in Example 6. There were thus obtained beads of poly(ethylene-g-styrene) containing 16.2% grafted polystyrene which were treated in a manner analogous to that described in Examples 7, 8 and 11 to give a shaped copolymer of poly-(ethylene-g-hydrazino styrene) suitable for reaction with steroids.

EXAMPLE 34

This example demonstrates the reaction of a carbonylic steroid with a copolymer according to our invention in the presence of an acidulated mixture of water and ethanol. An ethanol solution containing 5.7 mμg. 4-$^{14}$C-testostreone acetate was pipetted into a tapered test tube and placed in a water bath mainainted at a temperature of about 50° C. The ethanol was removed by evaporation by means of an air stream. The tube containing the steroid was cooled to room temperature, 30 mg. poly(trifluoromonochloroethylene-g-hydrazinostyrene) hydrochloride salt in powdered form was added to the tube followed by 0.2 ml. of a 25% v./v. solution of ethanol in water which had been made 0.1 M in respect of acetic acid. The tube was stoppered and shaken vigorously for 16 hours at room temperature. When the tube was removed from the shaker, the copolymer steroid complex settled rapidly. 0.5 ml. ethanol was added to the tube, the mixture was shaken vigorously, the steroid-copolymer complex was allowed to settle and the supernatant liquid containing unreacted 4-$^{14}$C-testosterone acetate was transferred to a liquid scintillation spectrometer counting vial. The copolymer-steroid complex was washed vigorously three times with 0.5 ml. portions of ethanol and the washings were transferred to the counting vial. The combined liquids in the counting vial were evaporated to dryness by means of an air stream and the residue examined quantitatively for radioactivity in a liquid scintillation spectrometer thus enabling the amount of steroid not reacted with the copolymer to be determined. By difference it was calculated that the copolymer had retained 95% of the steroid originally present.

EXAMPLE 35

An ethanol solution countaining 7.2 mμg. of 4-$^{14}$C-testosterone acetate was pipetted into a tapered test tube and placed in a water bath maintained at a temperature of about 50° C. The ethanol was removed by evaporation by means of an air stream. The tube containing the steroid was cooled to room temperature, 30 mg. poly(trifluoromonochloroethylene —g—$CH_2$—$N^+(CH_3)_2$—$CH_2CONHNH_2Cl^-$ styrene) was added followed by 0.2 ml. of a 25% v./v. solution of ethanol in water which had been made 0.5 M in respect of acetic acid. The tube was stoppered and shaken vigorously for 24 hours at room temperature. By using the estimating method of Example 24 it was determined that 96% of the steroid had been retained by the copolymer.

EXAMPLE 36

This example demonstrates the cleavage of a carbonylic steroid from a copolymer according to our invention and the recovery of the steroid as an O-methyloxime derivative.

An ethanolic solution of 0.2 M methoxyamine/0.5 M acetic acid was prepared. 0.4 ml. of this solution was added to the copolymer-steroid complex obtained in Example 35 and the mixture was shaken at room temperature for 16 hours. The amount of steroid recovered as its O-methyloxime dissolved in ethanol was determined by washing the copolymer with four 0.5 ml. aliquots of ethanol, evaporating the washings to dryness in a liquid scintillation spectrometer counting vial and measuring the radioactivity of the residue. It was determined that 92% of the steroid attached to the copolymer had been cleaved and recovered as the O-methyloxime of 4-$^{14}$C-testosterone acetate.

EXAMPLES 37, 38 AND 39

Examples 35 and 36 were repeated but replacing the 4-$^{14}$C-testosterone acetate of those examples by other 4-$^{14}$C-radioactive steroids. The reaction time for the treatment with methoxyamine was 20 hours. The results are given in Table III.

TABLE III

| Ex. | Steroid | Wt. of steroid mixed with copolymer reagent (mμg.) | Percent of steroid retained on copolymer | Percent of retained steroid recovered as O-methyl oxime |
|---|---|---|---|---|
| 37 | Δ⁵-androstene-3β-ol- 7-one (dehydroepiandrosterone). | 5.6 | 90 | 16 |
| 38 | Δ¹,³,⁵⁽¹⁰⁾-estratriene-3-ol-17-one (estrone). | 7.9 | 88 | 12 |
| 39 | Δ⁴-pregnene-11β, 17α, 21-triol-3:20-dione (progesterone). | 7.7 | 93 | 85 |

EXAMPLE 40

Using 7.2 mμg. 4-$^{14}$C-testosterone acetate the procedure of Example 34 was repeated. However the poly(trifluoromonochloroethylene - g - hydrazinostyrene) hydrochloride salt of that example was replaced by 20 mg. of poly(trifluoromonochloroethylene - g - thiosemicarbazidostyrene) and reaction time of the copolymer with the steroid was increased from 16 to 18 hours. It was determined that 50% of the steroid had been retained by the copolymer.

EXAMPLE 41

An ethanolic solution of 0.25 M hydroxylamine/0.5 M acetic acid was prepared. 0.4 ml. of this solution was added to the copolymer-steroid complex obtained in Example 34 and the mixture was shaken at room temperature for 16 hours. A 0.5 ml. aliquot of ethanol was added, the mixture was shaken vigorously and the supernatant liquid transferred to a liquid scintillation spectrometer counting vial. The copolymer was washed three times with 0.5 ml. portions of ethanol and the washings were transferred to the counting vial. The combined liquids were evaporated to dryness and the radioactivity of the residue measured. It was determined that 60% of the steroid attached to the copolymer had been cleaved and recovered as the oxime of 4-$^{14}$C-testosterone acetate.

EXAMPLE 42

Example 41 was repeated but the hydroxylamine of that example was repeated by a similar quantity of methoxyamine. The yield of O-methyloxime of 4-$^{14}$C-testosterone acetate was 60%.

EXAMPLES 43 TO 46 INCLUSIVE

Examples 34 and 42 were repeated but the 4-$^{14}$C-testosterone acetate of those examples was replaced by other 4-$^{14}$C-radioactive steroids as set out in Table IV.

TABLE IV

| Ex. | Steroid class according to number of carbon atoms per molecule | Steroid | Steroid mass mixed with copolymer reagent (mμg.) | Percent of steroid retained on copolymer | Percent of retained steroid recovered as O-methyl oxime |
|---|---|---|---|---|---|
| 43 | C₁₉ | Δ⁴-androstene-17β-ol-3-one (testosterone). | 7.6 | 96 | (¹) |
| 44 | | Δ⁴-androstene-3β-ol-17-one (dehydroepiandrosterone). | 4.6 | 82 | 73 |
| 45 | C₁₈ | Δ¹,³,⁵⁽¹⁰⁾-estratriene-3-ol-17-one (estrone). | 9.1 | 79 | 75 |
| 46 | C₂₁ | Δ⁴-pregnene-3:20-dione (progesterone). | 4.7 | 97 | 72 |

¹ Not determined.

EXAMPLE 47

This example demonstrates the introduction of nitrochloromethylated groups into our graft copolymer. 500 ml. fuming nitric acid was stirred in a 2000 ml. flask at 0° C. 50 g. of poly(tetrafluoroethylene-g-chloromethylstyrene) prepared as in Example 25 was slowly added to the stirred nitric acid keeping the temperature at 0° C. When addition was complete the mixture was stirred for 1 hour at 0° C., the polymer was then filtered off and washed with water until neutral. The product was given a final wash with methanol and dried in vacuo at 60° C. The poly-(tetrafluoroethylene-g-σ-nitrochloromethyl styrene) was light yellow in colour. The final weight of polymer was 50.95 gm. which corresponds to approximately one nitro group substitution per aromatic ring. The poly(tetrafluoroethylene-g-σ-nitrochloromethylstyrene) is useful as an intermediate to our graft copolymers.

We claim:

1. A solid graft copolymer comprising an inner polymeric backbone selected from the group consisting of polyolefins, polyimides, polyparaxylylenes and polyhaloolefins and a carbonylic steroid-reactive surface composed of polymeric side chains grafted onto said polymeric backbone and comprising a multiplicity of mer units of the formula:

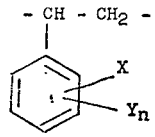

wherein X is a carbonylic steroid-reactive group selected from the group consisting of hydrazino, thiosemicarbazido and —CH₂—N⁺(CH₃)₂—CH₂—CONHNH₂Cl⁻, n is an integer from 0 to 2 and Y stands for a nitro group the backbone of said copolymer being essentially free of said carbonylic steroid-reactive groups and wherein said polymeric backbone comprises at least two-thirds by weight of said copolymers.

2. A graft copolymer according to claim 1 wherein the polymeric backbone is poly(trifluoromonochloroethylene).

3. A graft copolymer according to claim 1 wherein the polymeric backbone is poly(tetrafluoroethylene).

4. A graft copolymer according to claim 1 wherein the steroid reactive group is hydrazino.

5. A graft copolymer according to claim 1 wherein the steroid reactive group is

—CH$_2$—N$^+$(CH$_3$)$_2$—CH$_2$—CONHNH$_2$Cl$^-$

6. A graft copolymer according to claim 1 wherein the steroid reactive group is thiosemicarbazido.

7. A process of reacting a carbonylic steroid, said carbonylic steroid being a compound containing the perhydrocyclopentenophenanthrene nucleus having the skeleton structure:

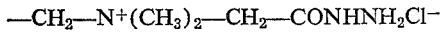

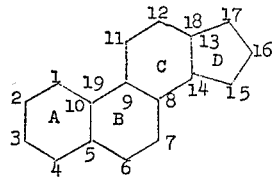

and wherein optionally the D ring may also be six-membered or the C ring may be five-membered and the D ring may be six-membered, numbered in the conventional manner and containing as a substituent at least one carbonyl group or hydroxy group which may be converted to a carbonyl group, with a solid graft copolymer comprising an inner polymeric backbone and a carbonylic steroid-reactive surface composed of polymeric side chains grafted onto said polymeric backbone and comprising a multiplicity of mer units of the formula:

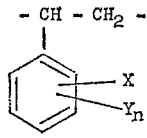

wherein X is a carbonylic steroid-reactive group selected from the group consisting of hydrazino, thiosemicarbazido and —CH$_2$—N$^+$(CH$_3$)$_2$—CH$_2$—CONHNH$_2$Cl$^-$, and wherein $n$ is an integer from 0 to 2 and Y stands for, a nitro group the backbone of said copolymer being essentially free of said carbonylic steroid-reactive groups and wherein said polymeric backbone is a polymer which is selected from the group consisting of polyolefins, polyimides, polyparaxylenes and polyhaloolefins and wherein said polymeric backbone comprises at least two-thirds by weight of said copolymer, said process comprising firstly adding said carbonylic steroid to said solid graft copolyer, secondly reacting said carbonylic steroid with said solid graft copolymer in an aqueous reaction medium, thirdly separating the copolymer-steroid complex so formed from the medium and, optionally, fourthly recovering the steroid from the said copolymer-steroid complex, characterized in that the medium is adjusted to a pH in the range from 2.5 to 6 by the addition of a water soluble carboxylic acid.

8. A surface graft polymeric composition comprising a solid graft copolymer according to claim 1 having chemically bonded to the surface thereof, a carbonylic steroid, said carbonylic steroid being a compound containing the perhydrocyclopentenophenanthrene nucleus having the skeleton structure:

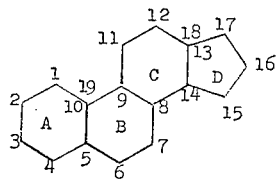

and wherein optionally the D ring may also be six-membered or the C ring may be five-membered and the D ring may be six-membered, numbered in the conventional manner and containing as a substituent at least one carbonyl group or hydroxy group which may be converted to a carbonyl group.

References Cited

UNITED STATES PATENTS

| 3,222,423 | 12/1965 | Roebuck | 260—877 |
| 3,253,057 | 5/1966 | Landler et al. | 260—877 |

FOREIGN PATENTS

| 801,528 | 9/1958 | England | 260—873 |
| 881,374 | 11/1961 | England | 260—873 |

JOSEPH L. SCHOFER, Primary Examiner

S. M. LEVIN, Assistant Examiner

U.S. Cl. X.R.

260—397, 884, 886; 424—1, 78